United States Patent [19]
Yoshioka et al.

[11] Patent Number: 5,665,520
[45] Date of Patent: Sep. 9, 1997

[54] OPTICAL RECORDING MEDIUM

[75] Inventors: Kazumi Yoshioka, Yawata; Tetsuya Akiyama, Habikino; Takeo Ohta, Nara; Hidemi Isomura, Osaka, all of Japan

[73] Assignee: Matsushita Electric Industrial Co., Ltd., Osaka, Japan

[21] Appl. No.: 452,497

[22] Filed: May 30, 1995

[30]  Foreign Application Priority Data

Jun. 13, 1994 [JP] Japan ................................. 6-155186

[51] Int. Cl.$^6$ ................................. G11B 7/24
[52] U.S. Cl. ................... 430/270.13; 430/945; 369/284
[58] Field of Search ...................... 430/270, 271, 430/273, 275, 495, 945, 270.13; 369/284

[56]  References Cited

U.S. PATENT DOCUMENTS

| | | | |
|---|---|---|---|
| 5,055,353 | 10/1991 | Yamamoto et al. | 428/336 |
| 5,098,761 | 3/1992 | Watanabe et al. | 428/64 |
| 5,191,565 | 3/1993 | Inoue et al. | 369/284 |
| 5,194,363 | 3/1993 | Yoshioka et al. | 430/271 |
| 5,234,737 | 8/1993 | Ueno et al. | 428/64 |
| 5,273,861 | 12/1993 | Yamada et al. | 430/271 |
| 5,276,670 | 1/1994 | Nogami et al. | 369/116 |
| 5,292,550 | 3/1994 | Fujii et al. | 427/165 |
| 5,362,538 | 11/1994 | Ohbayashi et al. | 428/64 |
| 5,368,986 | 11/1994 | Terao et al. | 430/270 |
| 5,525,379 | 6/1996 | Takada et al. | 427/571 |

FOREIGN PATENT DOCUMENTS

| | | |
|---|---|---|
| A-0 463 413 | 1/1992 | European Pat. Off. . |
| 2-56746 | 2/1990 | Japan . |
| 3-114884 | 5/1991 | Japan . |
| 4-134644 | 5/1992 | Japan . |
| 5-174425 | 7/1993 | Japan . |

OTHER PUBLICATIONS

Abstract of JP 4–141488, "Optical Recording Medium and Manufacture Thereof", Katsumi et al. (May 1992).
Abstract of JP 4–358334, "Optical Information Recording Medium", Hidemi et al. (Dec. 1992).

*Primary Examiner*—John A. McPherson
*Attorney, Agent, or Firm*—Morrison & Foerstep LLP

[57]  ABSTRACT

On one surface of a disk substrate, a first dielectric layer, a thin recording layer, a second dielectric layer and a reflecting layer are cumulatively formed. The second dielectric layer is thinner than the first dielectric layer and is 35–70 nm thick. The reflecting layer is 70–120 nm thick. The total thickness of the four layers is 250–430 nm. The compressire stress of the layers is offset by tensile stress generated by an overcoat resin protective layer, formed on the reflecting layer. A method of using the optical recording medium applies the MCAV (Modified Constant Angular Velocity) recording method which records information by changing recording frequencies in accordance with linear velocity. The linear velocity is 5–12 m/s. A ratio of an inner circumference recording pulse width to an outer circumference recording pulse width is 1.2 or more.

12 Claims, 4 Drawing Sheets

OPTICAL RECORDING MEDIUM

FIELD OF THE INVENTION

The invention relates to an optical recording medium (indicated as a disk hereinafter) which can record, reproduce and delete information at high density and capacity by a laser beam or the like, and further relates to a method of using the optical recording medium.

BACKGROUND OF THE INVENTION

Reloadable disks are conventionally used for many purposes. A disk typically includes a disk-type transparent substrate, and a thin recording layer on one surface of the substrate. Data is repeatedly recorded and deleted by reversibly changing the optical density of the thin recording layer. The thin recording layer of the disk is crystallized in advance, and is then heated, melted and quenched by irradiating the thin recording layer with about a 1 μm laser beam and changing the intensity of the beam. As a result, the layer becomes amorphous and records information. In addition, the amorphous recording thin layer is crystallized by raising the temperature of the layer in a range between the crystallization temperature and the melting point and then annealing the layer, thus deleting information.

When a resin substrate, for example, is used for the disk-thin recording layer is formed directly on the substrate, the substrate is heated to a high temperature in a minute section of about 1 μm by recording and deleting and is thus deformed. Therefore, in general, a dielectric layer is formed as a heat insulating layer between the substrate and the thin recording layer and between the thin recording layer and a layer protecting the thin recording layer (protective layer), thus preventing thermal deformation of the substrate. Since the temperature rise, quenching and annealing properties of the thin recording layer vary due to the heat conduction properties of the protective layer, recording and deleting characteristics of the disk are improved by selecting preferable materials and layer composition. Furthermore, the recording and deleting characteristics of the disk are improved by forming a reflecting layer on the surface of the dielectric layer facing the protective layer and utilizing the multiple interference of a laser beam. This four-layer disk structure is generally well known.

A rapid cooling disk structure is proposed for the four-layer reloadable disk. In the rapid cooling disk structure, the dielectric layer between the thin recording layer and the reflecting layer (identified as a second dielectric layer hereinafter) is thinned so that heat generated in the thin recording layer during recording and deleting is quickly released to the reflecting layer. The rapid cooling disk structure has an advantage in that the outer limits of the erase rate and power improve since the temperature of the dielectric layers on both sides of the thin recording layer rises by widely dispersing the heat from the thin recording layer. It is also advantageous in making the thin recording layer amorphous since the layer is cooled quickly in this structure. Japanese Patent Application No. Sho 63-207040 (Published Unexamined (Laid-open) Japanese Patent Application No. Hei 02-056746) discloses a rapid cooling disk structure. In this application, the second dielectric layer is thinner than the dielectric layer between the disk substrate and the thin recording layer (identified as a first dielectric layer hereinafter) and is 30 nm thick or less.

However, when the thickness of the second dielectric layer is 30 nm or less, the recording and deleting sensitivities of the disk decline, so that an expensive high power semiconductor laser has to be used. In addition, the first and the second dielectric layers are under thermal stress, expanding and shrinking due to rapid heating at 400° C. or higher and cooling for repeated recording and deleting. Although the second dielectric layer has a smaller heat load than the first dielectric layer, the layer repeatedly receives thermal stress. The layer should thus have a proper thickness. The thickness of the second dielectric layer has to be selected in consideration not only of the heat conduction but also of optical properties.

SUMMARY OF THE INVENTION

It is an object of this invention to solve the above-mentioned problems by providing an optical recording medium, which has high recording sensitivity and is excellent in recording and deleting repeatedly, and a method of using the optical recording medium.

In order to accomplish these and other objects and advantages, the optical recording medium includes a transparent substrate, a first dielectric layer formed on one surface of the transparent substrate, a thin recording layer which is formed on the first dielectric layer, a second dielectric film formed on the thin recording layer, and a reflecting layer formed on the second dielectric layer. The thin recording layer has properties of becoming amorphous after its temperature is increased, then melting and quenching by absorbing energy from the irradiation of a laser beam, and of crystallizing its amorphous state by temperature rise. The second dielectric layer is thinner than the first dielectric layer and is 35–70 nm thick, and the thickness of the reflecting layer is 70–120 nm.

It is preferable that the thin recording layer is 18–30 nm thick. The first dielectric layer preferably is 140–210 nm thick. The first and the second dielectric layers preferably contain ZnS at 60–95 mol % and $SiO_2$ at 5–40 mol %.

The reflecting layer preferably contains Al as a main material and at least one metal selected from the group comprising Ti, Ni, Cr, Cu, Ag, Au, Pt, Mg, Si and Mo.

The thin recording layer preferably contains Te, Ge and Sb, and preferably also contains nitrogen. The thin recording layer preferably contains GeTe, $Sb_2Te_3$, Sb and nitrogen.

The thin recording layer is preferably composed so that $0.2 \leq b \leq 0.5$ where b is the mol ratio of $Sb/Sb_2Te_3$.

The optical recording medium preferably further includes a 3–15 μm thick overcoat protective layer on the reflecting layer, and that the protective layer, which preferably generates tensile stress.

It is preferable that the overcoat resin is sealed for stress relaxation.

The first dielectric layer, the thin recording layer, the second dielectric layer and the reflecting layer are preferably 250–430 nm thick altogether, and preferably have $0.5 \times 10^9$ $dyn/cm^2$ or less compressire stress.

The optical recording medium preferably is recorded with information on one surface, and an angle where a tangent of the surface and the horizontal reference plane of the medium intersect each other is preferably 1–2 mrad so as to protrude the surface.

The transparent substrate preferably has a convex surface. An angle where a tangent of the convex surface and the horizontal reference plane of the substrate intersect each other is preferably 1–2 mrad, and the first dielectric layer, the thin recording layer, the second dielectric layer and the reflecting layer are preferably cumulatively formed on the convex surface.

The method of using an optical recording medium of the invention applies the MCAV (Modified Constant Angular Velocity) recording method which records by varying recording frequencies in accordance with linear velocity. The linear velocity is 5–12 m/s. The recording pulse width of the inner circumference is larger than that of the outer circumference, and the ratio of the inner circumference recording pulse width to the outer circumference recording pulse width is 1.2 or above. The optical recording medium includes a transparent substrate, a first dielectric layer formed on one surface of the transparent substrate, a thin recording layer formed on the first dielectric layer, a second dielectric film formed on the thin recording layer, and a reflecting layer formed on the second dielectric layer. The thin recording layer has properties of becoming amorphous after its temperature is increased, then melting and quenching by absorbing energy from the irradiation of a laser beam, and of crystallizing its amorphous state by temperature rise. The second dielectric layer is thinner than the first dielectric layer and is 35–70 nm thick, and the thickness of the reflecting layer is 70–120 nm.

The recording pulse width preferably is 40–60 ns at 5 m/s linear velocity and is 30–40 ns at 12 m/s.

The MCAV recording method preferably is applied so as to record information by varying a record starting point at the maximum of 7.75 μm in 5–12 m/s linear velocity.

The optical recording medium comprises the transparent substrate, the first dielectric layer, the thin recording layer, the second dielectric film, and the reflecting layer. The thin recording layer has the above-mentioned properties. The second dielectric layer is thinner than the first dielectric layer and is 35–70 nm thick, and the thickness of the reflecting layer is 70–120 nm. Thus, the optical recording medium has high recording sensitivity and excellent repeated recording and deleting properties.

A mixed material of ZnS and SiO₂ having excellent heat resisting properties and relatively small heat conduction is used for the first and the second dielectric layers. The second dielectric layer is 35–70 nm thick, and has not only excellent optical properties but also mechanical strength. The second dielectric layer widens the distance between the thin recording layer and the reflecting layer, and slows down the cooling speed of the thin recording layer. As a result, the recording sensitivity of the optical recording medium is improved.

The thickness and heat capacity of the reflecting layer is reduced while the mechanical strength and optical properties of the layer are maintained, so that recording sensitivity improves. In other words, the thermal properties and recording sensitivity of the optical recording medium can be controlled by choosing a preferable layer thickness. Since the reflecting layer utilizes the multiple interference of a laser beam, the layer can prevent deterioration and crystal growth in a high temperature and humidity environment by containing at least one element selected from the group comprising Ti, Ni, Cr, Cu, Ag, Au, Pt, Mg, Si and Mo in addition to Al.

The thin recording layer contains Te, Ge and Sb; To, Go, Sb and nitrogen; GeTe, Sb₂Te₃ and Sb; or GeTe, Sb₂Te₃, Sb and nitrogen. The thin recording layer is composed so that $0.2 \leq b \leq 0.5$ where b is the mol ratio of Sb/Sb₂Te₃. It is not preferable to have b greater than 0.5 since the erase rate declines due to the decrease in crystallization speed. When b is less than 0.2, there is a problem in that the recording amplitude of an inner circumference having a low linear velocity is reduced. By adding nitrogen to the thin recording layer, the heat conductivity of the layer is reduced. The crystallization speed of the layer is also reduced by increasing the amount of Sb. As a result, the recording sensitivity of the optical recording medium is improved.

In the MCAV recording method, the recording pulse width of the inner circumference is set larger than that of the outer circumference at 5–12 m/s linear velocity, so that heat up temperature at the inner and the outer circumferences during recording is set equal. Thus, marks of almost the same size are formed, thereby reducing mass transfer of the thin recording layer caused by overlapped marks during overwriting and improving the cycle properties of overwrite.

The total thickness of the first dielectric layer, the thin recording layer, the second dielectric layer and the reflecting layer is 250–430 nm. The 3–15 μm thick overcoat resin layer generating tensile stress is formed on the reflecting layer. As a result, tilt of the optical recording medium is almost eliminated. Tilt is an angle where the horizontal reference plane of the medium and a tangent of the surface of the medium formed with the layers intersect each other. In addition, by using a transparent substrate having a convex surface, the tilt of the optical recording medium is further minimized.

In addition, information is recorded in the MCAV recording method by varying the record starting point at the maximum of 7.7 μm within the range of 5–12 m/s linear velocity, so that the mass transfer at the thin recording layer becomes even and the cycle properties of overwrite improve.

BRIEF DESCRIPTION OF THE DRAWINGS

FIG. 2 (b) is a graph showing the correlation between the thickness of a second dielectric layer and amplitude.

FIG. 2 (c) is a graph showing the correlation between the thickness of a reflecting layer and the recording power.

DETAILED DESCRIPTION OF THE INVENTION

Figure 1:
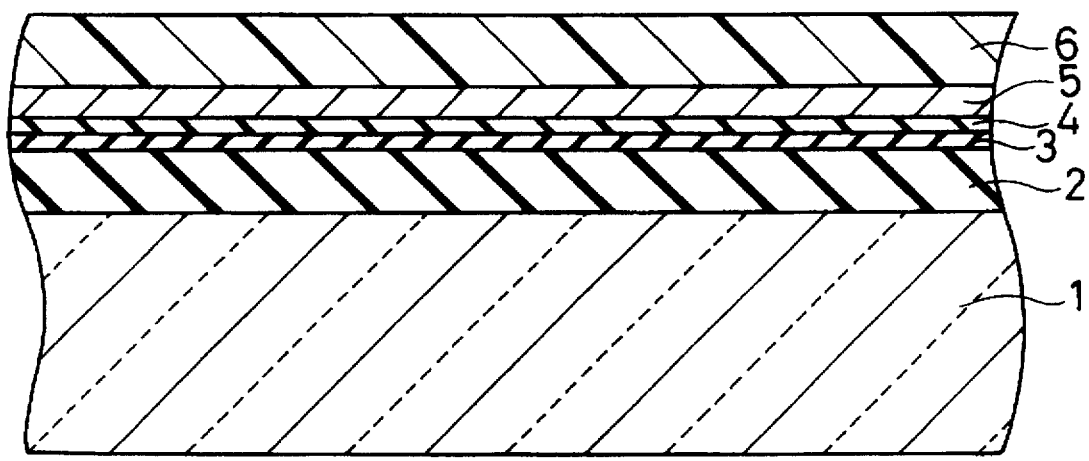
FIG. 1 is a cross sectional view of an optical recording medium of an embodiment of the invention.

Embodiments will be explained by referring to figures. As shown in FIG. 1, an optical recording medium of the invention consists of a transparent disk substrate 1, a first dielectric layer 2, a thin recording layer 3, a second dielectric layer 4, a reflecting layer 5 and an overcoat protective layer 6. The second dielectric layer is thinner than the first dielectric layer, and the second dielectric layer and the reflecting layer are 35–70 nm thick and 70–120 nm thick respectively, so that recording sensitivity and overwrite properties improve. The thin recording layer is 18–30 nm, and is also so thin that heat capacity can be minimized and information can be recorded with small power. Disk substrate 1 shown in FIG. 1 is a transparent resin substrate, such as a polycarbonate resin substrate, or a glass substrate. First dielectric layer 2 formed on disk substrate 1 is made of, for example, a heat resisting mixed material of ZnS and SiO₂, and is 140–210 nm thick. Thin recording layer 3 formed on first dielectric layer 2 is made of a mixed material of. GeTe, Sb$_2$Te$_3$ and Sb, and nitrogen. The layer is 18–30 nm thick. The thin recording layer is composed so that $0.2 \leq b \leq 0.5$ where b is the mol ratio of Sb/Sb$_2$Te$_3$. Sb has correlations with crystallization speed. It is not preferable to have b greater than 0.5 since the erase rate declines due to the decrease in crystallization speed. When b is less than 0.2, there is a problem in that the recording amplitude of an inner circumference having a low linear velocity is reduced. Second dielectric layer 4 formed on thin recording layer 3 is made of the same material used for first dielectric layer 2, and is 35–70 nm thick. Reflecting layer 5 formed on second dielectric layer 4 utilizes the multiple interference of a laser beam, and is mainly made of Al. The thickness of the reflecting layer is 70–120 nm. When only Al is used for the reflecting layer, crystal grain size in the layer grows under a high temperature and humidity environment, so that the quality of the layer deteriorates due to intergranular corrosion. Thus, besides Al, at least one element selected from the group comprising Ti, Ni, Cr, Cu, Ag, Au, Pt, Mg, Si snd Mo is added to the layer so as to prevent crystal growth and deterioration under the above environment. Overcoat resin protective layer 6 formed on reflective layer 5 cures and shrinks, thus generating tensile stress. The layer is made of ultraviolet ray curing resin, and is formed by a spin coat method at a thickness of 3–15 μm. A vacuum evaporation method or a sputtering method is applied to form first dielectric layer 2, second dielectric layer 4, thin recording layer S and reflecting layer 5.

When a 35 mW semiconductor laser is used so as to record on a phase change optical disk, the maximum output of the disk is 14 mW with 40% transmission efficiency of optical pickup. In consideration of the unevenness of optical pickup, it is necessary for a disk to record at 12 mW or less. In order to improve reloading properties by increasing the recording sensitivity of a disk, not only optical properties but also thermal properties and mechanical strength have to be considered.

The reasons for specifying the range of layer thickness are explained below.

(1) The thickness of the first dielectric layer 2 will now be explained. The thicknesses of thin recording layer 3, second dielectric layer 4 and reflecting layer 5 were fixed, and the thickness of first dielectric layer 2 was varied. Within the range of 140–210 nm thickness, the absorption Ad of crystal with optical characteristic, the absorption Aw of an amorphous state, and the difference in reflectance (ΔR) of crystal showing a signal size and the amorphous state almost stayed the same. Recording power (C/N ratio>50 dB power) was also the same. When the thickness was outside the range, there was a problem in that ΔR and signal amplitude became small.

Figure 2:
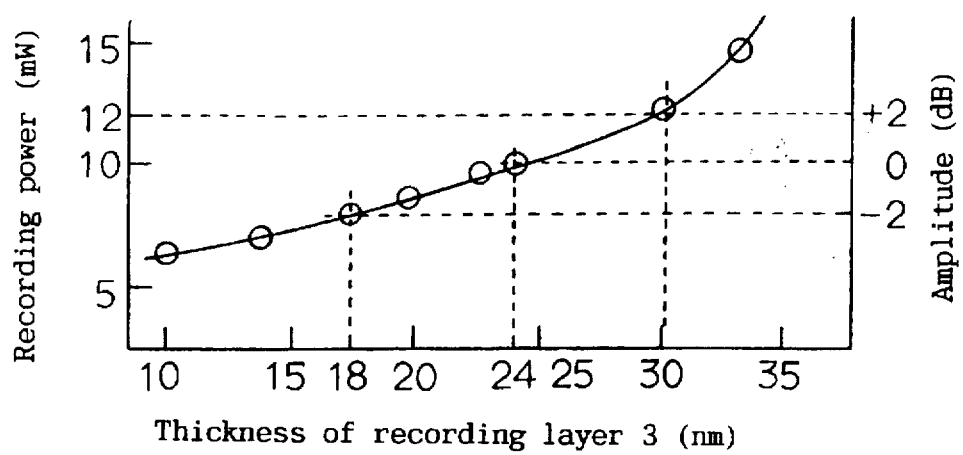
FIG. 2 (a) is a graph showing the correlation of the thickness of a thin recording layer, amplitude and recording power.
Figure 2:
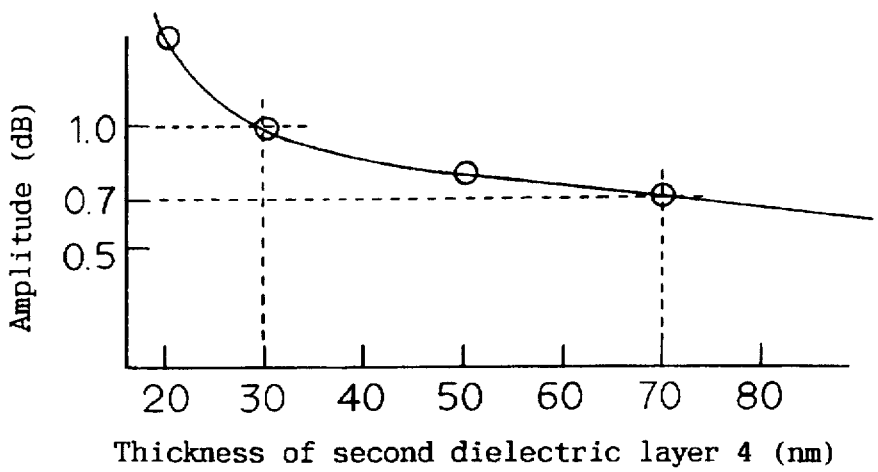
Figure 2:
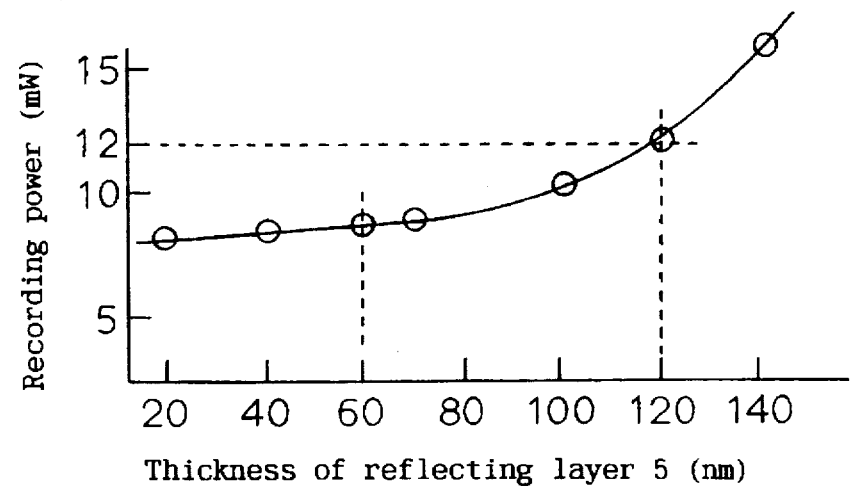

(2) The thickness of the thin recording layer 3 will now be explained. FIG. 2 (a) is a graph showing recording power when the thicknesses of the first dielectric layer 2, the second dielectric layer 4 and the reflecting layer 5 are fixed at 170 nm, 40 nm and 70 nm respectively and the thickness of the thin recording layer is varied. According to the graph, when the recording power is 12 mW or less and amplitude is within ±2 db, the thickness of thin recording layer 3 is 18–30 nm. When the thickness is more than 30 nm, heat capacity becomes large and sensitivity lowers. The amplitude becomes small when the thickness is less than 18 nm, thus providing an undesirable result.

(3) The thickness of the second dielectric layer 4 will now be explained. The thickness of the layer has to be determined in consideration of optical properties and thermal cooling speed. FIG. 2 (b) is a graph showing the correlation between recording power and signal amplitude when the thicknesses of the first dielectric layer 2, the thin recording layer 3 and the reflecting layer are fixed at 170 nm, 23 nm and 70 nm respectively and the thickness of the second dielectric layer 4 is varied. The signal amplitudes from using 70 nm or less thickness of second dielectric layer 4 are within –3 dB of the amplitude with 30 nm thickness. When the thickness is more than 70 nm, the signal amplitudes are undesirably small. The recording power is 12 mW or less when the thickness is 30 nm or more. Recording thin layer 3 becomes close to reflecting layer 5 when the thickness of the second dielectric layer is less than 30 nm. Thus, more heat is likely to disperse and sensitivity declines, thus providing undesirable results.

(4) The thickness of the reflecting layer 5 will now be explained. The thickness of the layer has to be decided in consideration of heat capacity and mechanical strength. FIG. 2 (c) is a graph showing recording power when the thicknesses of first dielectric layer 2, thin recording layer 3 and second dielectric layer 4 are fixed at 170 nm, 23 nm and 40 nm respectively, and the thickness of the reflecting layer is varied. When the reflecting layer is 120 nm or less thick, recording sensitivity with 12 mW or less recording power is obtained. Recording power is 9 mW and constant when the thickness is 70 nm or less. The experiment of overwrite cycle properties was directed to disks of various reflecting layer thickness. In the experiment, random signals, modulated to "2–7" modulation by PPM (Pit Position Modulation) recording, were used. At 5 m/s linear velocity, 4.03 MHz was employed as the maximum recording frequency, and 8.87 MHz was used as the maximum recording frequency at 12 m/s linear velocity. The wavelength of the semiconductor laser was 780 nm, and NA (Numerical Aperture) was 0.5. Jitter, gaps between signals to be recorded and recorded signals, was measured by a time interval analyzer. As a result, when the thickness was less than 80 nm, it was found that the mechanical strength of the reflecting layer was weak. With 80 nm or more thickness, the layer had 100,000 or more overwrites. Therefore, the thickness of the reflecting layer is preferably 70–100 nm.

If the mixed ratio of SiO$_2$ in ZnS—SiO$_2$ constituting first and second dielectric layers 2 and 4 is 5 mol % or less, the effect of minimizing crystal grain size is reduced. When the ratio is 40 mol % or more, the strength of SiO$_2$ becomes insufficient. Thus, it is preferable that the mole fraction of SiO$_2$ is 5–40 mol %.

Moreover, the temperature at the inner and the outer circumferences during recording is the same since the recording pulse width of the inner circumference is set larger than that of the outer circumference. Thus, the sizes of recording marks become almost the same at the inner and the outer circumferences, thus minimizing mass transfer at the thin recording layer, caused by overlapping masks, and signal deterioration. It is preferable that the pulse width of the inner circumference is 40–60 ns and that of the outer circumference, 30–40 ns. Within these ranges of pulse width and within the range of 5–12 m/s for the inner and the outer circumferences, an overwrite experiment was carried out. The deterioration of jitter at 100,000 or more overwrites was not found. Thus, the ratio of pulse width of the inner circumference relative to that of the outer circumference is 1.2 or more.

In the invention, first and second dielectric layer 2 and 4 made of ZnS and SiO$_2$, thin recording layer 3 comprising Te, Ge, Sb and nitrogen and reflecting layer 5 made mainly of Al are formed on a 1.2 mm thick substrate having a 120 mm disk diameter. The total thickness of these four layers is 430 nm or less. When the layers are formed on a signaling surface of the disk substrate, the surface protrudes, thus generating compressive stress and about 3 mrad tilt. Therefore, by forming 3-15 μm thick overcoat resin protective layer 6 generating tensile stress on the reflective layer, the compressive stress is offset. As a result, an optical disk having little tilt is provided with only about 1-2 mrad even on the outer circumference. Overcoat resin protective layer 6 cannot offset the compressive stress if its thickness is less than 3 μm because the strength of the layer is not sufficient. On the other hand, when the layer is more than 15 μm thick, its tensile stress is so large that the surface of the optical disk where the layers are formed becomes concave and the tilt of the disk becomes large. Thus, the thickness of overcoat resin protective layer 6 is preferably 3-15 μm. A mixed material of acrylic ultraviolet ray curing resin, such as urethane acrylate, and acrylic ester monomer is used for overcoat resin protective layer 6. However, the material for the layer is not limited to this alone. The above-mentioned properties can be provided as long as the material for the layer has about 10 percentage of contraction by curing.

Figure 3:
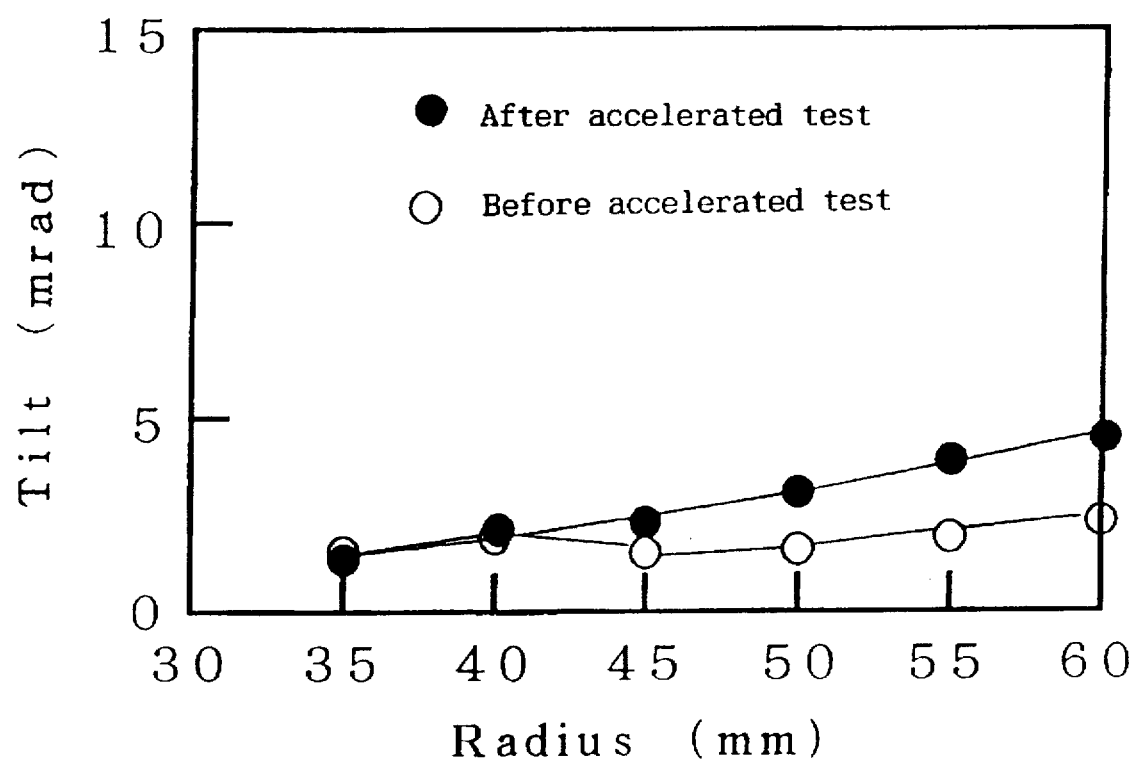
FIG. 3 is a graph showing the tilt of an optical recording medium of one embodiment of the invention before and after an accelerated test.

A substrate is molded beforehand to have a convex surface with 1-2 mrad tilt (surface to be recorded with information) relative to an inner circumference reference plane. Then, first dielectric layer 2, thin recording layer 3, second dielectric layer 4 and reflecting layer 5 are formed on the surface. The total thickness of the four layers is 430 nm or less, and the compressive stress of the layers is $0.5 \times 10^9$ dyn/cm$^2$ or less. Ultraviolet ray curing resin is formed on reflecting layer 5 at 3-15 μm thickness as overcoat protective layer 6 for generating tensile stress, thus decreasing tilt. After forming the overcoat protective layer on the four layers, the substrate and the layers are annealed at 100° C. for one hour, so that the stresses of the substrate, the thin layers, and the overcoat protective layer are relaxed during the forming step. Moreover, the substrate and the layers will not be deformed. As a result, the negative effect on recording properties caused by tilt such as off-tracking can be minimized. The above-noted substrate, which has a concave surface with 1-2 mrad (surface to be recorded with information) relative to an inner circumference reference plane, can be easily prepared by means of changing the temperature distribution of a metallic mold by an injection method. In the above-mentioned method, the tilt of a disk can be set to less than 5 mrad. The disk prepared in the method described above was placed in an environment of 80% humidity and 90° C. for 20 hours (accelerated test), and then was removed. The disk was left to sit at room temperature, and its tilt was measured. The surface of the disk formed with layers warped significantly into a convex shape for several hours after removal. However, after 48 hours, the tilt became less than 5 mrad even though the tilt of the outer circumference was slightly greater than the tilt before the accelerated test (FIG. 3). The tilt was measured by an optical disk tester: LM-110 (manufactured by Ono Sokki Co., LTD, Japan).

Figure 4:
FIG. 4 shows a waveform picture of an optical recording medium of one embodiment of the invention after overwriting 100,000 times.

At the 5-12 m/s linear velocity of the MCAV recording method, which records by changing recording frequencies in accordance with linear velocity, information is recorded within a range where the information is stored in a sector by changing a record starting point, and is overwritten evenly in the sector. Thus, mass transfer that is generated by recording new marks over previously recorded marks becomes even. As a result, the optical recording medium of the invention prevents the phenomenon whereby recording layers shift to a section and accumulate where the same signals are always recorded such as a resync section, lowering recording sensitivity. This effect of the invention is significant at a low power side where the overlap of marks is small, so that the power margins of overwrite properties increase. When the record starting point was changed at the maximum of 7.75 μm and was shifted by a 0.484 μm interval, no deterioration was found after overwriting 100,000 times, as shown in FIG. 4, and the effect was significant.

The invention is explained in further detail in the following example.

EXAMPLE 1

On one surface of a 1.2 mm thick polycarbonate substrate 120 mm in diameter, a 170 nm thick dielectric layer was formed of a mixed material of ZnS and SiO$_2$ that contained SiO$_2$ at 20 mol %. A 26 nm thick recording layer made of a material of Te$_{53.0}$Ge$_{22.6}$Sb$_{24.4}$ (Te:53.0 atom %, Ge:22.6 atom % and Sb:24.4 atom %)) mixed with nitrogen was formed on the first dielectric layer. On the recording layer, a 44 nm thick second dielectric layer was formed of the same material as the material used for the first dielectric layer. A 95 nm thick reflecting layer made of Al alloy was formed on the second dielectric layer by a sputtering method. The high frequency sputtering method was applied to form the first and the second dielectric layers with 2 mTorr sputtering pressure and by using Ar gas (30 SCCM). The direct current sputtering method was applied to form the recording layer with 1 mTorr sputtering pressure and by using a mixed gas of Ar (15SCCM) and N$_2$ (0.8SCCM). The reflecting layer was formed by the direct current sputtering method with 2 mTorr sputtering pressure and Ar gas (15SCCM). In order to protect the four layers, acrylic ultraviolet curing resin, such as SD101 (manufactured by DAINIPPON INK & CHEMICALS, Japan) which is a mixed material of urethane acrylate and acrylic ester monomer, was coated on the reflecting layer to 5 μm thickness by a spin coat wave, thus preparing a single plate structure disk. The tilt of the disk was measured by an optical disk tester (LM110 manufactured by Oho Sokki Co., LTD, Japan), and was 3 mrad. The recording and erasing properties of the disk were measured by an optical disk drive having 2026 rpm, a 780 nm semiconductor laser wavelength and 0.5 NA. At the outermost circumference with 12 m/s linear velocity, signals at 8.87 MHz recording frequency were recorded with 32 ns pulse width. The C/N ratio was measured by a spectrum analyzer and was 50 dB or more. The build-up power of the C/N ratio was 12 mW. 8.32 MHz signals were overwritten after 8.87 MHz signals were recorded, so that the erase ratio was obtained by subtracting spectrum in the process of overwriting 3.32 MHz signals from spectrum in the process of recording 8.87 MHz signals; this was 25 dB.

The cycle properties of overwrite were tested. Random signals modulated to "2-7" by PPm recording were used to test overwrite.

The method of recording by changing a record starting point within a range of keeping recording information in a sector was applied. The record starting point was changed by 7.75 μm at maximum, and was randomly shifted at an interval of 0.484 μm within a range.

At the inner circumference with 5 m/s linear velocity, 4 MHz was applied as the highest recording frequency. 8.87 MHz was used as the highest frequency at the outer circumference with 12 m/s linear velocity. Jitter was measured by a time interval analyzer. According to the measurement, no deterioration was found from the beginning to 100,000 or more overwrites at 5 m/s and 12 m/s linear velocity.

EXAMPLE 2

The following table shows the change in recording sensitivity and overwrite properties of a disk when the thicknesses of the first and the second dielectric layers and of the reflecting layer are changed. The layers were formed by the method applied in Example 1.

| Sample No. | Condition | | | Results | |
|---|---|---|---|---|---|
| | * (nm) | ** (nm) | *** (nm) | Recording sensitivity | Overwrite |
| 1 | 230 | 30 | 95 | X | Δ |
| 2 | 210 | 35 | 95 | Δ | ○ |
| 3 | 170 | 43 | 95 | ○ | ○ |
| 4 | 140 | 50 | 95 | ○ | ○ |
| 5 | 130 | 55 | 95 | ○ | X |
| 6 | 170 | 62 | 95 | ○ | ○ |
| 7 | 150 | 70 | 95 | Δ | ○ |
| 8 | 160 | 75 | 95 | Δ | X |
| 9 | 170 | 43 | 60 | ○ | X |
| 10 | 140 | 53 | 70 | ○ | ○ |
| 11 | 190 | 53 | 80 | ○ | ○ |
| 12 | 150 | 53 | 90 | ○ | ○ |
| 13 | 130 | 53 | 100 | ○ | ○ |
| 14 | 210 | 53 | 110 | ○ | ○ |
| 15 | 140 | 53 | 120 | ○ | ○ |
| 16 | 170 | 53 | 130 | X | ○ |
| 17 | 48 | 53 | 95 | X | X |
| 18 | 40 | 53 | 95 | X | X |
| 19 | 35 | 53 | 95 | X | X |

*Thickness of first dielectric layer
**Thickness of second dielectric layer
**Thickness of reflecting layer
○: Good, Δ: Fair, X: Poor As has been shown, the optical recording medium has high recording sensitivity and excellent repeated recording and deleting properties.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. An optical recording medium comprising a transparent substrate, a first dielectric layer comprising a mixed material of ZnS and SiO$_2$ formed on one surface of said transparent substrate, a recording layer formed on said first dielectric layer, a second dielectric layer comprising a mixed material of ZnS and SiO$_2$ formed on said recording layer, and a reflecting layer formed on said second dielectric layer; wherein:

(i) said recording layer has properties of becoming amorphous after its temperature is increased, then melting and quenching by absorbing energy from the irradiation of a laser beam, and of crystallizing its amorphous state by temperature rise;

(ii) said second dielectric layer is thinner than said first dielectric layer and is 35–70 nm thick;

(iii) said reflecting layer is 70–120 nm thick and comprises Al and at least one metal selected from the group consisting of Ti, Ni, Cr, Cu, Ag, Au, Pt, Mg, Si and Mo;

(iv) the combined thickness of the first dielectric layer, the recording layer, the second dielectric layer and the reflecting layer is 250–430 nm; and (v) the compressive stress of said first dielectric layer, said recording layer, said second dielectric layer, and said reflecting layer is $0.5 \times 10^9$ dyn/cm$^2$ or less.

2. The optical recording medium as in claim 1, wherein the recording layer is 18–30 nm thick.

3. The optical recording medium as in claim 1, wherein the first dielectric layer is 140–210 nm thick.

4. The optical recording medium as in claim 1, wherein each of said mixed material comprises SiO$_2$ 5–40 mol % and ZnS at 60–95 mol %.

5. The optical recording medium as in claim 1, wherein the recording layer comprises Te, Ge and Sb.

6. The optical recording medium as in claim 5, wherein the recording layer further comprises nitrogen.

7. The optical recording medium as in claim 1, wherein the recording layer comprises GeTe, Sb$_2$Te$_3$, Sb and nitrogen.

8. The optical recording medium as in claim 7, wherein the recording layer is composed so that $0.2 \leq b \leq 0.5$ where b is the mol ratio of Sb/Sb$_2$Te$_3$.

9. The optical recording medium as in claim 1, further comprising a 3–15 μm thick overcoat resin protective layer on the reflecting layer; said overcoat resin protective layer generating tensile stress.

10. The optical recording medium as in claim 9, wherein said overcoat resin is annealed for stress relaxation.

11. The optical recording medium as in claim 1, wherein said optical recording medium is recorded with information on one surface; and wherein an angle where a tangent of said surface and a horizontal reference plane of said optical recording medium intersect each other is 1–2 mrad so as to protrude said surface.

12. The optical recording medium as in claim 1, wherein the transparent substrate has a convex surface; wherein an angle where a tangent of said convex surface and a horizontal reference plane of said transparent substrate intersect each other is 1–2 mrad; and wherein the first dielectric layer, the recording layer, the second dielectric layer and the reflecting layer are cumulatively formed on said convex surface.

* * * * *